United States Patent [19]

Stacha, Jr.

[11] 3,818,438
[45] June 18, 1974

[54] VEHICLE BACK-UP WARNING SYSTEM
[75] Inventor: Joe Stacha, Jr., Longview, Tex.
[73] Assignee: R. E. Blount, Longview, Tex. ; a part interest
[22] Filed: July 6, 1972
[21] Appl. No.: 269,458

[52] U.S. Cl.................................. 340/70, 340/46
[51] Int. Cl.............................................. B60q 1/26
[58] Field of Search............. 340/70, 271, 46, 81 F, 340/81 R, 52, 74

[56] References Cited
UNITED STATES PATENTS

| | | | |
|---|---|---|---|
| 1,106,432 | 8/1914 | Wilcox | 340/52 R UX |
| 1,999,885 | 4/1935 | Tarlton | 340/46 |
| 2,671,848 | 3/1954 | Swayne | 340/70 UX |
| 2,758,249 | 8/1956 | Garrigus | 340/70 UX |
| 2,829,213 | 4/1958 | Brett | 340/70 X |
| 3,034,098 | 5/1962 | Clasen | 340/81 R |
| 3,411,036 | 11/1968 | Casey | 340/46 |
| 3,437,994 | 4/1969 | Forsberg | 340/70 |
| 3,439,324 | 4/1969 | Kirimoto et al. | 340/70 |
| 3,469,233 | 9/1969 | Havlicek et al. | 340/81 F |
| 3,560,923 | 2/1971 | Parkes | 340/81 R |
| 3,569,927 | 3/1971 | Guyton et al. | 340/70 X |
| 3,629,819 | 12/1971 | Peterson | 340/70 |
| 3,665,391 | 5/1972 | Bumpous | 340/70 X |
| 3,683,330 | 8/1972 | Lancaster | 340/74 X |

FOREIGN PATENTS OR APPLICATIONS

| | | | |
|---|---|---|---|
| 241,406 | 10/1925 | Great Britain | 340/80 |

*Primary Examiner*—Donald J. Yusko

[57] ABSTRACT

A tamper-proof back-up, electrical warning system particularly for use on heavy vehicles such as tractors, road scrapers, motor graders, material handling equipment, and the like, to provide an audible signal to warn persons standing to the rear of such vehicle of backward movement of the vehicle. The electrical warning system has two flasher units and two signal circuits rendered selectively operable by a manual selector switch and arranged so that if one of the flasher units and audible signal circuits should fail, the other can be used. The signal circuits are selectively connected in series with the ignition switch and with a magnetically operated switch that is automatically closed by manual movement of the vehicle shift lever into a reverse position. In addition, a manual by-pass switch is connected in the circuit so that if the magnetic switch operated by the shift lever becomes inoperable, the warning system can be independently activated manually at the time the operator shifts the lever into reverse.

4 Claims, 3 Drawing Figures

PATENTED JUN 18 1974　　　　　　　　　　　　　　　3,818,438

3,818,438

VEHICLE BACK-UP WARNING SYSTEM

FIELD OF THE INVENTION

This invention relates to a vehicle warning system that provides an intermittent, preferably audible signal whenever the vehicle is moving backward.

DESCRIPTION OF THE PRIOR ART

Signaling devices on vehicles to indicate that they are in backward motion are well known in the art. However, most of these are complicated and expensive, particularly currently available electronically operated signaling devices.

Prior signaling devices are also subject to the objection that they soon become fouled by dust and dirt, particularly when the vehicle is in use in road construction. Many of such devices include components that are not readily available when needed, thus interrupting use of the vehicle for long periods of time. Further objection to some such prior devices is that they are so constructed that the components are not readily accessible even if replacement parts are available. Still others require special tools for servicing.

The present back-up warning system overcomes all of the foregoing objections.

SUMMARY OF THE INVENTION

The present invention relates to a warning system for vehicles, and more particularly to an improved back-up warning system that is designed for heavy duty use on tractors, trucks, road graders and scrapers, lift trucks, and the like, for providing a warning signal whenever the vehicle is backing up.

Briefly, the present back-up warning system comprises a main circuit controlled by the vehicle ignition switch and having a magnetic switch in series therewith that is normally open, but is automatically closed upon movement of the vehicle reverse lever or gear shift lever into a reverse position. Two branch circuits, each having an intermittent flasher unit, are connectable with the main circuit selectively to render one or the other of the flasher units operable. A selector switch is provided for manually selecting one or the other of the branch circuits, or for rendering the non-selected circuit operable upon failure of the selected circuit. In addition to the flasher unit, each branch circuit is connected with audible signal means arranged in the circuit to be operated by either branch circuit. A by-pass switch is provided for activating the warning system in the event of failure of the magnetic switch to operate in response to reverse movement of the gear shift lever. The warning system is connected to the vehicle ignition switch so that the system cannot be operated when the vehicle is not in use, thus rendering the system tamper-proof.

The principal object of the invention is to provide a reliable back-up warning system that can be applied to all types of reversible motor vehicles and which is designed for heavy duty use.

Another object is to provide a vehicle back-up warning system that, in effect, includes two warning systems, either of which can be placed in operation by the operator, and wherein one of the systems can be rendered effective in the event that the other system has failed, thus assuring double reliability.

Another object is to provide a vehicle back-up warning system that is tied in with the ignition circuit of the vehicle and with a switch that is closed when the gear shift lever is in reverse position so that the system normally will not operate unless the engine is operating and the vehicle is conditioned for reverse movement.

Still another object is to provide a vehicle back-up warning system including a manually operable by-pass switch in shunt relation with a gear shift lever-actuated switch that will render the system operative in the event that the gear shift lever-operated switch becomes misaligned or defective, thus assuring additional reliability.

A further object is to provide a vehicle back-up warning system comprising standard components that are available in most automotive and electrical supply stores and which are inexpensive and can be readily replaced in the event of failure without the use of any special tools or equipment, and with a minimum of "down time."

A still further object is to provide a vehicle back-up warning system that is simple in design and construction, simple to install on a vehicle and to service, and which will operate substantially maintenance-free.

Other and further objects of the invention will be apparent from the following description taken in conjunction with the accompanying drawings.

DESCRIPTION OF THE PREFERRED EMBODIMENT

Figure 1:
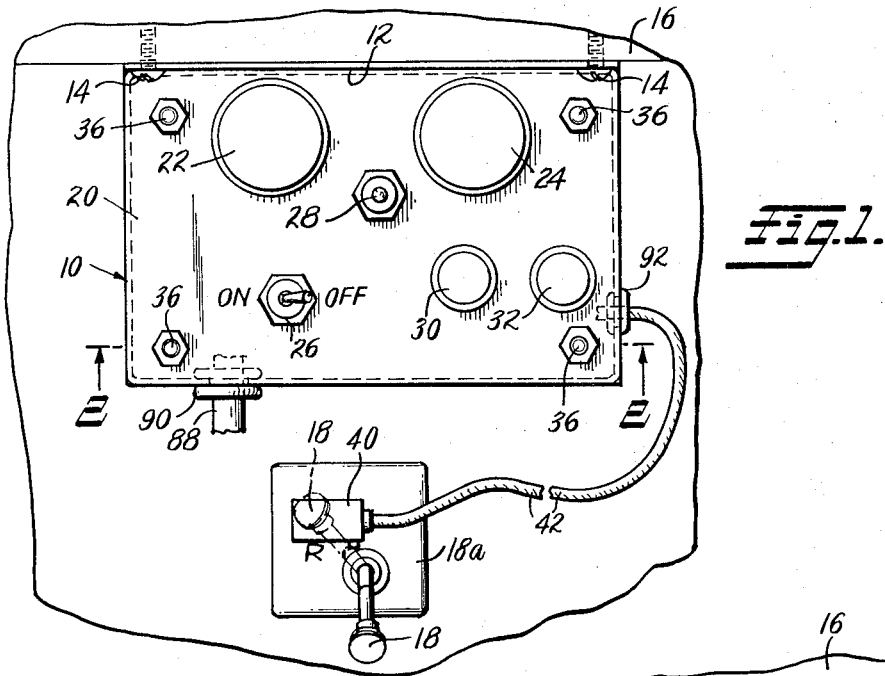
FIG. 1 is a schematic plan view of the control box of the present vehicle back-up warning system and showing the magnetic switch mounted for engagement by the vehicle shift lever upon movement to its reverse position.
Figure 2:
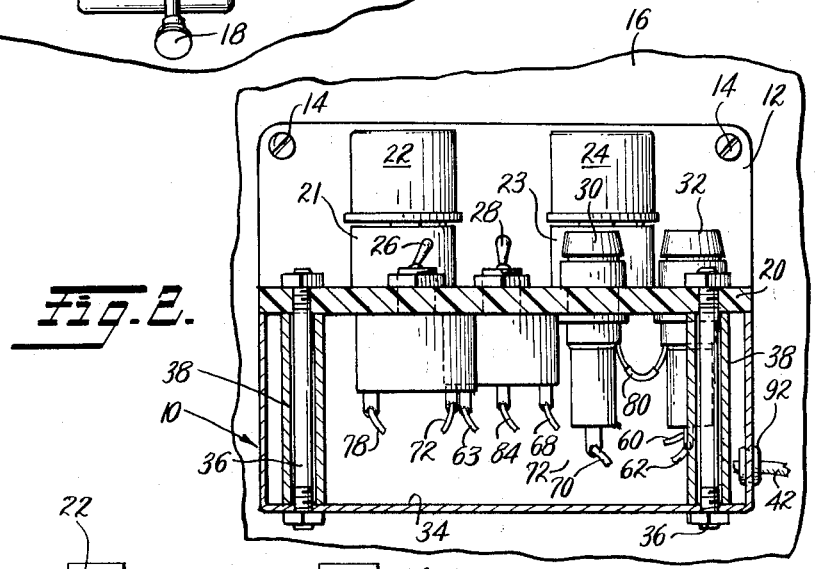
FIG. 2 is a vertical sectional view through the control box, taken on the line 2—2 of FIG. 1.

Referring to the drawings, and by way of example and not limitation, the back-up warning system comprises 6 × 4 × 4 inches electrical enclosure 10 secured in any suitable manner to a vertical mounting plate 12. The plate 12 can be attached to the vehicle by screws 14 at a location convenient to the operator. In the case of a vehicle such as a truck, the control box can be mounted on the dash 16 convenient to the driver and near the gear shift lever 18. A "Bakelite" panel 20 closes the top of the box 10 and has mounted thereon sockets 21 and 23 for two conventional flasher units 22 and 24, respectively, of the type commonly used to intermittently energize automotive turn signal lights. The flasher units 22 and 24 will correspond in voltage to that of the power supply and most commonly will be 12-volt units, although the present warning system will work equally well with 6- and/or 24-volt power supplies. It will be understood that in the present system only two of the usual three prongs on the flasher units 22 and 24 are used, which means that only two wires are connected with the flasher sockets 21 and 23, as will be described hereinafter.

Also mounted on the panel 20 is a by-pass switch 26, a flasher unit selector switch 28, and cartridge-type fuses 30 and 32. The panel 20 fits tightly against the top edges of the box 10 and is secured to the bottom wall 34 of the box by four bolts 36 and spacer sleeves 38. The panel 20 forms a seal with the box 10 to protect the components and wiring therein from contamination by dirt and moisture.

As is shown in FIG. 1, a conventional magnetically operated switch 40 is mounted on the transmission 18a so that it can be engaged by a reverse lever, or gear shift lever, 18 when it is moved into its reverse drive position, shown in dot-and-dash lines. The switch 40 is connected in an electrical circuit with the components in the control box 10 by a conductor cable 42, as will be described hereinafter.

The magnetically operated switch 40 may be a conventional ADEMCO magnetic contactor switch of the type commonly used in burglar alarm systems. In this type of switch the parts do not have to be in total contact to complete the circuit. The switch 40 is so designed that minor variations in alignment, as between it and the gear shift lever 18, which may be caused by wear, will not affect its operation. Nor will the operation of the switch 40 be affected by bouncing or vibrations of the vehicle. On vehicles having two or more reverse speeds, such as power shift transmission, two or more magnets can be used, as required, to actuate the switch 40 upon shifting into reverse for any given reverse speed ratio.

The by-pass switch 26 and flasher selector switch 28 are conventional toggle switches, and the fuses 30 and 32 are of the standard cartridge type used in automobiles. The by-pass switch 26 is a single-pole, single-throw switch, and the selector switch 28 is a single-pole, double-throw switch. The flasher units 22 and 24 are of a standard heavy duty type.

Figure 3:
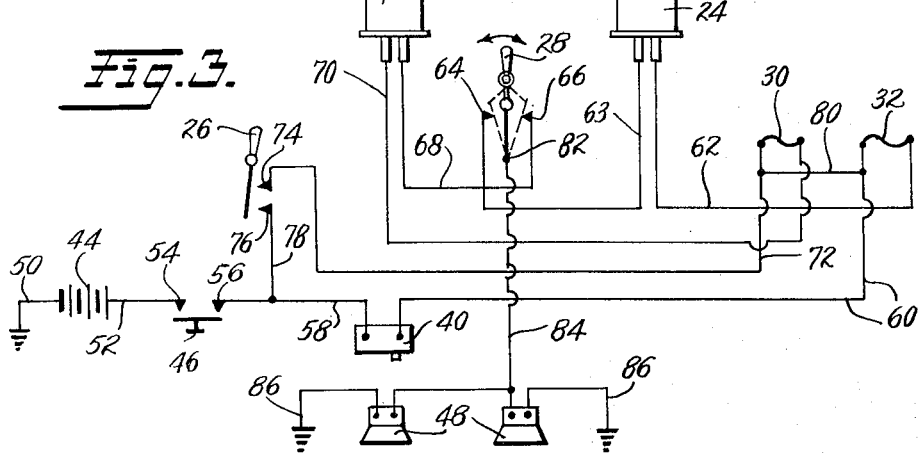
FIG. 3 is a schematic view of the electrical circuit for the back-up warning system.

Referring to FIG. 3, which is a schematic circuit diagram, the warning system comprises a source of current, which may be an auto battery 44, a main control, or ignition switch, 46 and a pair of horns 48, preferably located at the rear of the vehicle. It will be understood that a single horn, an electrically operated bell, or a flashing light could be substituted for the two horns 48.

One post of the battery 44 is connected to ground by a cable 50 and connected to the ignition switch 46 in the customary manner. For simplicity, a conductor 52 is shown connecting the other post of the battery 44 with a contact 54 of the ignition switch 46. The other contact 56 of the ignition switch 46 is connected by a conductor 58 to one side of the magnetic switch 40. A conductor 60 connects the other side of the switch 40 with one end of the fuse 32. The conductors 58 and 60 comprise the cable 42 referred to above. The other end of the fuse 32 is connected by a conductor 62 to one side of the flasher socket 23 of the flasher 24, the other side of which is connected by a conductor 63 with a contact 64 of the flasher selector switch 28. The other contact 66 of the selector switch 28 is connected by a conductor 68 to one side of the socket 21 of the flasher 22, the other side of which is connected by a conductor 70 with one end of the fuse 30. The other end of the fuse 30 is connected by a conductor 72 to one contact 74 of the by-pass switch 26, the other contact 76 of which is connected by a conductor 78 to the conductor 58 at a point between the ignition switch 46 and the magnetic switch 40, or in advance of the latter switch. A conductor 80 interconnects the conductors 60 and 72 associated with the fuses 30 and 32. The selector switch 28 has a common terminal 82 connected by a conductor 84 to one side of each of the horns 48, the other side of each of the horns being connected to ground by conductors 86. Thus, the horns 48 are connected in the circuit in parallel. The conductor 84 could be connected with the vehicle horn (not shown), but it is preferred to use the additional horns 48.

It will be apparent from FIG. 3 that the ignition switch 46 and the gear shift lever-actuated switch 40 are connected in series, so that both must be closed before current can be supplied to the remainder of the circuit. It will also be noted that the by-pass switch 26 is connected in parallel with the magnetically operated switch 40, so that if the switch 40 should fail to operate, the warning system can be activated by the vehicle operator closing the switch 26 at the time the gear shift lever 18 is moved into reverse position. It will further be noted that the selector switch 28 is so connected with the horns 48 through the conductor 84 and to the flasher units 22 and 24 that either of the flashers may be connected in circuit with the battery 44, control switch 46, magnetically operated switch 40, fuses 30 and 32, and the horns 48. Thus, the system can be maintained in an operative condition even though one of the flasher units 22 or 24 has failed.

In order to energize the back-up warning system, the ignition switch 46 must be in its "on" position and the gear shift lever 18 must be in a reverse position to close the magnetic switch 40. Also, the selector switch 28 must be in one of its two operative positions. In the following description it will be assumed that the switches 46 and 40 are closed.

It will be apparent from FIG. 3 that separate circuits are available to activate either of the flasher units 22 or 24, depending upon the position of the toggle lever of the selector switch 28. Thus, when the lever of switch 28 is moved to the left to engage contact 66, current will be made available to energize the system to activate the flasher unit 22 through conductors 60, 80, fuse 30, conductor 70 (to flasher unit 22) through conductor 68, selector switch 28, and conductor 84 to the horns 48 to intermittently sound said horns.

On the other hand, when the lever of the selector switch 28 is moved to the right, to engage contact 66, the circuit to the flasher unit 24 only will be activated. In such situation the circuit will be completed through conductor 60, fuse 32, conductor 62 (to flasher unit 24), conductor 63, through selector switch 28 to conductor 84 to the horns 48 to intermittently sound said horns.

It will also be seen from FIG. 3 that the ignition switch 46 controls the entire warning system circuit. Beyond the point of the ignition switch 46, the circuit is normally controlled by the magnetic switch 40. However, if the switch 40 fails to close for any reason, the by-pass switch 26 can be manually closed and thus provide a shunt circuit around the switch 40 to place the warning system in operation, with the flasher units 22 and 24 remaining selectively operable as before described, except that current to the flasher circuits will be supplied through conductor 72 instead of conductor 60. The by-pass switch 26 also makes it possible to energize the horns 48 even though the switch 40 is operative, and without the gear shift lever 18 being in its reverse position. However, the ignition switch 46 must be closed at such time.

The various conductors connected with the components of the control box 10 may comprise a single cable 88, shown in FIG. 1 passing through a rubber grommet 90, which forms a seal with the box. The cable 42 also preferably extends through a grommet 92.

It will be understood that various changes may be made in the arrangement and selection of the components of the present system without departing from the principles of the invention or the scope of the annexed claims.

I claim:

1. In a vehicle having a transmission, a shift lever movable into a reverse position, a battery, and an ignition switch connected with said battery, the improvement comprising an operative and a standby back-up warning system, including: a shift lever-actuated switch connected in an electrical circuit in series with said ignition switch and said battery and arranged to be closed upon movement of the shift lever into a reverse position; a first flasher unit connected with said shift lever-actuated switch in a first series circuit; a second flasher unit connected with said shift lever-actuated switch in a second series circuit; a first and a second grounded warning signal means; a conductor connecting said warning signal means in parallel; a single pole double throw selector switch having a common contact connected with said conductor and also having first and second contacts connected with said first and second series circuits, respectively, containing said flasher units, said single pole double throw selector switch when closed to engage said one contact completing a circuit to said first flasher unit and its associated warning signal means to render the same operative, and when closed to engage said second contact, completing a circuit to said second flasher unit and its associated warning signal means to render the same operative, whereby when said selector switch is closed and the shift lever-actuated switch is also closed, electrical current will be supplied through said selector switch to the operative one of said first or second flasher units and its associated warning signal means to intermittently energize the same.

2. A vehicle back-up warning system as recited in claim 1, including additionally a manually operable by-pass switch connected in the circuit in parallel with the shift lever-actuated switch, and being operable manually to activate the system in the event that said shift lever-actuated switch fails to close.

3. A vehicle back-up warning system as recited in claim 1, wherein a fuse is connected in series in each of the flasher unit circuits, and wherein one end of each of the fuses is interconnected by a conductor.

4. A vehicle back-up warning system as recited in claim 3, wherein the vehicle warning system includes a manually operable by-pass switch connected in the circuit in parallel with the shift lever-actuated switch that is operable manually to activate the system in the event that said shift lever-actuated switch fails to close, a control box having a nonconducting panel and wherein the selector switch, flasher units, fuses and by-pass switch are mounted upon said panel, and wherein conductors in the circuits connected thereto in the control box are sealed from the elements.

* * * * *